United States Patent
Basmaji et al.

(10) Patent No.: US 11,073,071 B2
(45) Date of Patent: Jul. 27, 2021

(54) FUEL INJECTOR WITH DIVIDED FLOWPATH NOZZLE

(71) Applicant: Ford Global Technologies, LLC, Dearborn, MI (US)

(72) Inventors: Joseph F. Basmaji, Waterford, MI (US); Sangjin Hong, Ann Arbor, MI (US); Mark Meinhart, Dexter, MI (US); Jianwen Yi, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 16/520,240

(22) Filed: Jul. 23, 2019

(65) Prior Publication Data
US 2021/0025317 A1    Jan. 28, 2021

(51) Int. Cl.
| F02M 61/00 | (2006.01) |
| F02B 23/10 | (2006.01) |
| F02M 61/18 | (2006.01) |
| F02B 75/12 | (2006.01) |

(52) U.S. Cl.
CPC ....... *F02B 23/101* (2013.01); *F02M 61/1806* (2013.01); *F02M 61/1853* (2013.01); *F02B 2023/103* (2013.01); *F02B 2075/125* (2013.01)

(58) Field of Classification Search
CPC ........... F02M 61/1806; F02M 61/1813; F02M 61/1833; F02M 61/1846; F02B 23/101; F02B 2023/103
See application file for complete search history.

(56) References Cited

U.S. PATENT DOCUMENTS

| 3,727,636 A * | 4/1973 | Simmons | F02C 7/232 137/541 |
| 4,657,189 A * | 4/1987 | Iwata | F02M 51/0678 239/533.12 |
| 4,771,948 A * | 9/1988 | Furukawa | F02M 51/0675 239/533.12 |
| 4,773,374 A * | 9/1988 | Kiuchi | F02M 51/0678 123/470 |
| 4,867,128 A * | 9/1989 | Ragg | F02M 51/08 123/531 |
| 4,925,110 A * | 5/1990 | Takeda | F02M 51/0678 239/533.12 |
| 4,982,716 A * | 1/1991 | Takeda | F02M 69/047 123/470 |

(Continued)

FOREIGN PATENT DOCUMENTS

JP    2009236048 A    10/2009

*Primary Examiner* — Thomas N Moulis
(74) *Attorney, Agent, or Firm* — Geoffrey Brumbaugh; McCoy Russell LLP

(57) ABSTRACT

A fuel delivery system and a direct injector for directly injecting fuel into a cylinder are provided. In one example, a direct fuel injector includes a nozzle in fluidic communication with a fuel source, the nozzle includes at least one fuel flow path that divides into two exit flow paths within the nozzle defining a plurality of exit orifices stemming from a common inlet orifice thereby improving the atomization and mixing of the fuel as it enters the cylinder. A plurality of spaced-apart divided fuel flow paths may be positioned within the nozzle to further optimize mixing and reduce wall and piston wetting.

17 Claims, 9 Drawing Sheets

(56) References Cited

U.S. PATENT DOCUMENTS

| | | | | |
|---|---|---|---|---|
| 5,016,819 A | * | 5/1991 | Wood | F02M 51/061 239/522 |
| 5,035,358 A | * | 7/1991 | Katsuno | F02M 69/08 239/403 |
| 5,224,458 A | * | 7/1993 | Okada | F02M 67/12 123/432 |
| 5,301,879 A | * | 4/1994 | Takeda | B05B 1/265 239/408 |
| 5,556,034 A | * | 9/1996 | Sakakida | F02M 51/0653 239/417.3 |
| 5,592,820 A | * | 1/1997 | Alary | F04D 29/541 60/751 |
| 5,725,158 A | * | 3/1998 | Klaski | F02M 61/16 239/522 |
| 6,092,741 A | * | 7/2000 | Sumida | F02M 51/0671 239/408 |
| 6,270,332 B1 | | 8/2001 | Huggins et al. | |
| 6,622,693 B2 | | 9/2003 | Arndt et al. | |
| 9,194,351 B2 | | 11/2015 | Albrodt et al. | |
| 9,828,961 B2 | * | 11/2017 | Kaneta | F02M 61/1833 |
| 10,590,899 B2 | * | 3/2020 | Schnobrich | F02M 61/1806 |
| 2003/0141387 A1 | * | 7/2003 | Xu | F02M 61/162 239/533.12 |
| 2004/0021013 A1 | | 2/2004 | Lawrence | |
| 2008/0041344 A1 | | 2/2008 | Wing et al. | |
| 2008/0116301 A1 | * | 5/2008 | Yasukawa | F02M 61/1853 239/533.12 |
| 2011/0220739 A1 | * | 9/2011 | Sakai | F02M 61/1853 239/533.2 |
| 2015/0000286 A1 | * | 1/2015 | LeBegue | F23R 3/28 60/742 |
| 2016/0195052 A1 | * | 7/2016 | Kaneta | F02M 61/1826 123/299 |
| 2018/0023443 A1 | * | 1/2018 | Inclan | B01F 5/061 60/282 |
| 2018/0171954 A1 | * | 6/2018 | Mulye | F02M 61/1853 |
| 2018/0318848 A1 | * | 11/2018 | Bobusch | F15B 21/12 |

* cited by examiner

FUEL INJECTOR WITH DIVIDED FLOWPATH NOZZLE

FIELD

The present description relates generally to a fuel injector with an injection nozzle that divides an inlet flow path into multiple outlet flow paths in a fuel delivery system of an engine.

BACKGROUND/SUMMARY

Fuel delivery systems in internal combustion engines have employed fuel injectors to deliver fuel directly into engine combustion chambers. Previous direct fuel injectors have included nozzles with a small number of orifices that provide jets of fuel to combustion chambers during desired intervals. One example approach shown by Albrodt, in U.S. Pat. No. 9,194,351, is a fuel injection valve. Albrodt discloses a fuel injection valve with a perforated disk at the end of the injector valve. The perforated disk includes outlet openings configured to spray fuel in a pattern that promotes mixing. In particular, the outlet openings arrangement in Albrodt generates swirl in the fuel spray, to increase mixing in a combustion chamber. The inventors have recognized several problems with Albrodt's fuel injection valve as well as other fuel injectors. For example, the disk in the fuel injection valve includes a small number of openings directing a portion of the fuel spray to combustion chamber walls and the piston. Therefore, engines employing Albrodt's fuel injection valve may experience wall wetting. Consequently, the fuel on the walls may not fully combust during the power stroke, thereby increasing emissions (e.g., smoke and particulate matter emissions) and reducing combustion efficiency.

The inventors have recognized the aforementioned problems and facing these problems developed a direct fuel injector, in one example. The direct fuel injector includes a nozzle in fluidic communication with a fuel source. The nozzle including a fuel flow path for transmitting fuel from a fuel source therethrough. The fuel flow path entering the nozzle through an inlet orifice and dividing within the nozzle to split the fuel flow path with a splitter to form a least two fuel exit flow paths, each fuel exit flow path defining an exit orifice on an exhaust side of the nozzle. As a result, engines employing the direct fuel injector may achieve emission reductions and combustion efficiency gains. In particular, the spray pattern generated by the fuel injector may be optimized to reduce smoke and particulate matter emissions.

As one example, a plurality of fuel flow paths are provided within the nozzle, each spaced-apart from the other and arranged to maximize fuel cavitation through the fuel flow paths. The separator's cross sectional shape, exit flow path deflection angle, inlet flow path angle and length and other geometric properties of the fuel flow paths may be also be modified for a particular application so as optimize the fuel atomization, spray pattern, distribution and velocity as desired for a particular application.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a direct fuel injector in a fuel delivery system of an internal combustion engine. The direct fuel injector generates a spray pattern that improves fuel atomization and decreases wall wetting. For instance, the nozzle may include a divider therein that split the fuel flow path from the inlet intake side of the nozzle to the outlet exhaust side of the nozzle, thereby providing more outlet orifices for improved fuel distribution and mixing without compromising the structural integrity the nozzle.

Moreover, the internal geometry of the split flow paths may be optimized to improve fuel spray characteristics as desired. For example, a plurality of fuel flow paths may be provided within the nozzle, each spaced-apart from the other and arranged to maximize fuel cavitation through the fuel flow paths. In addition, the separator's cross sectional shape, exit flow path deflection angle, inlet flow path angle and length and other geometric properties of the fuel flow paths may be also be modified for a particular application so as optimize the fuel spray pattern, distribution and velocity as desired for a particular application. Resultantly, emissions may be reduced and combustion efficiency may be increased in engines utilizing the direct fuel injector described herein.

Figure 1:
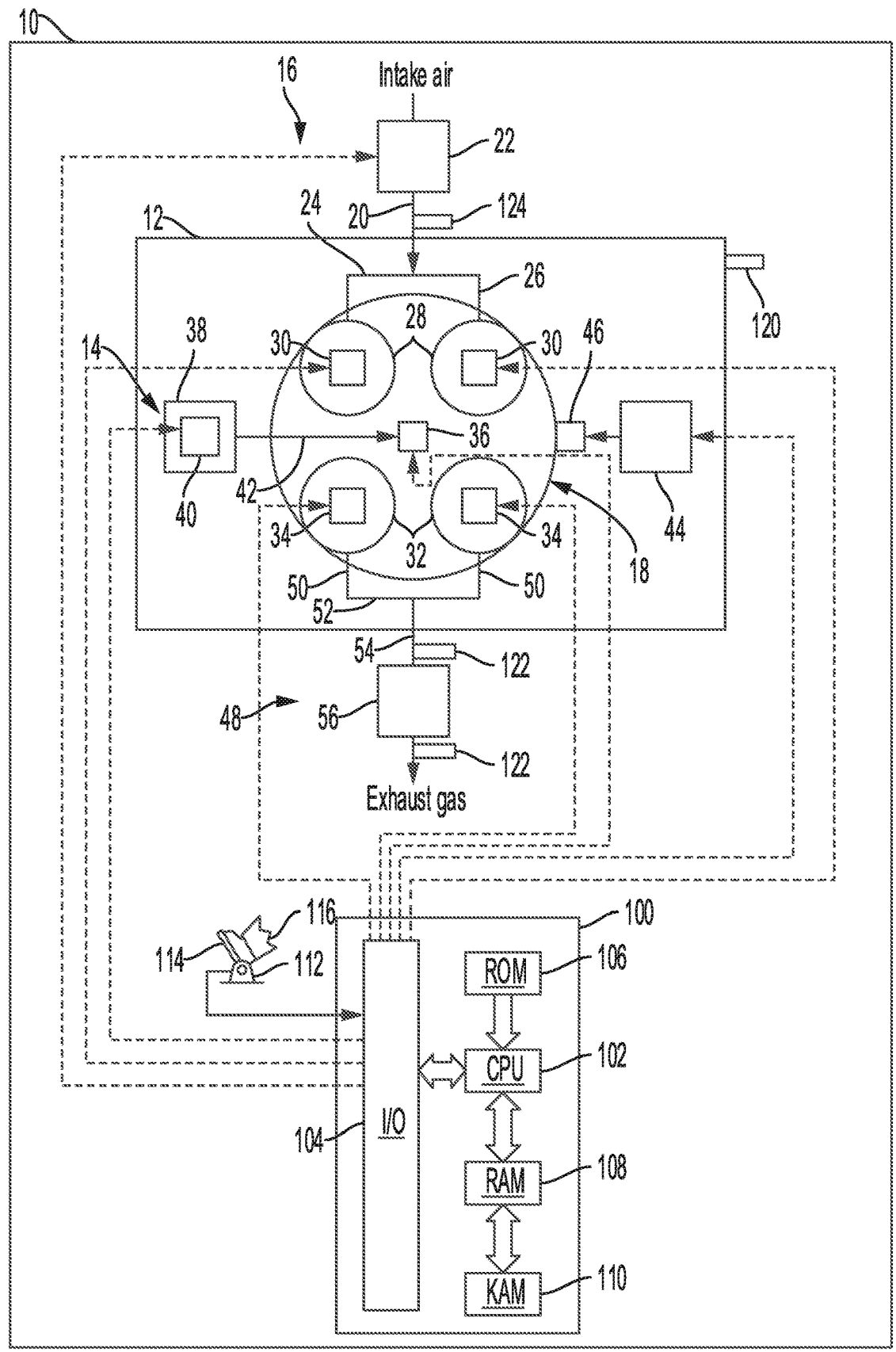
FIG. 1 shows a schematic depiction of an internal combustion engine.
Figure 2:
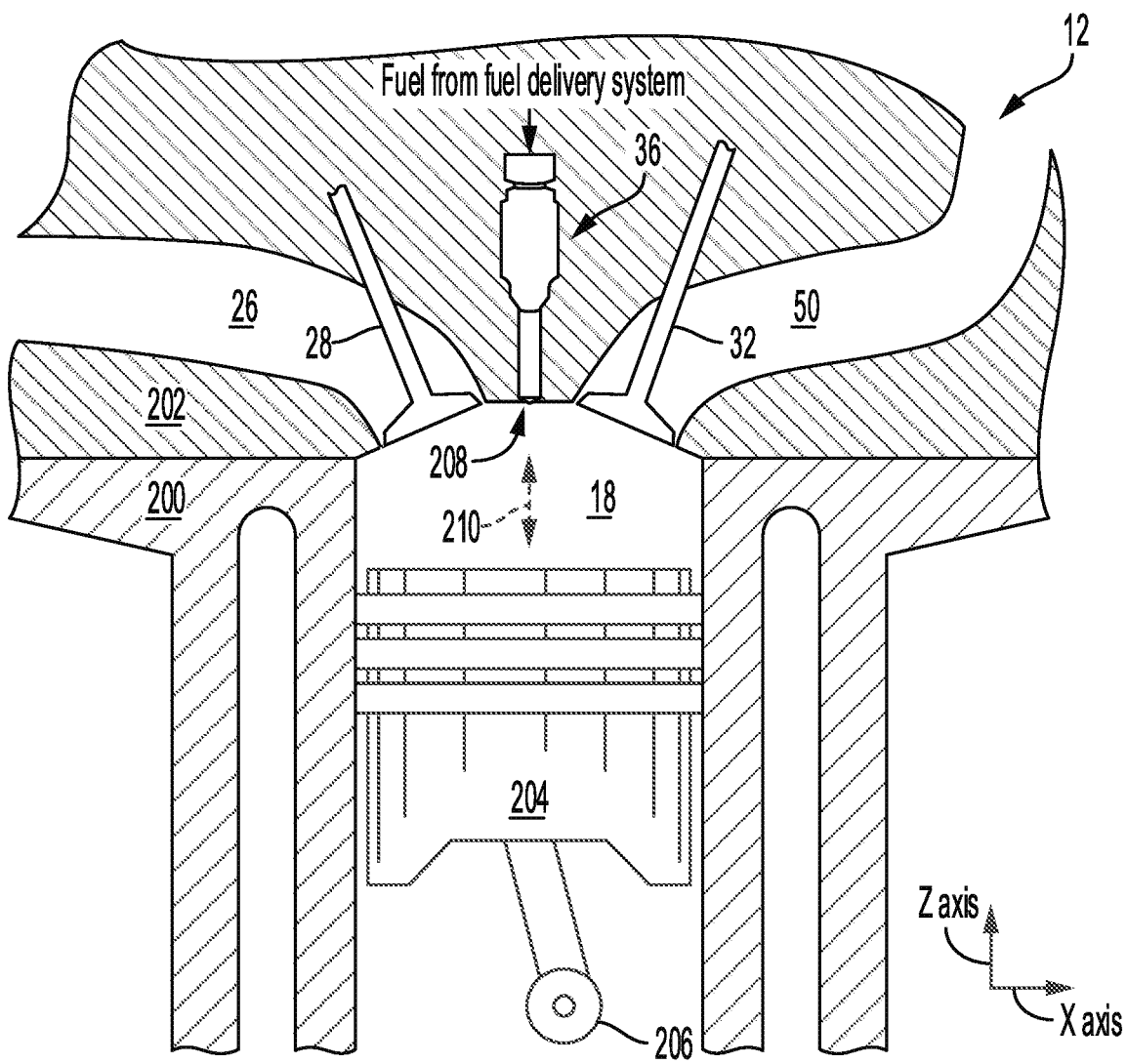
FIG. 2 shows an illustration of an example cylinder with a direct fuel injector in the internal combustion engine, shown in FIG. 1, in cross-section.
Figure 3:
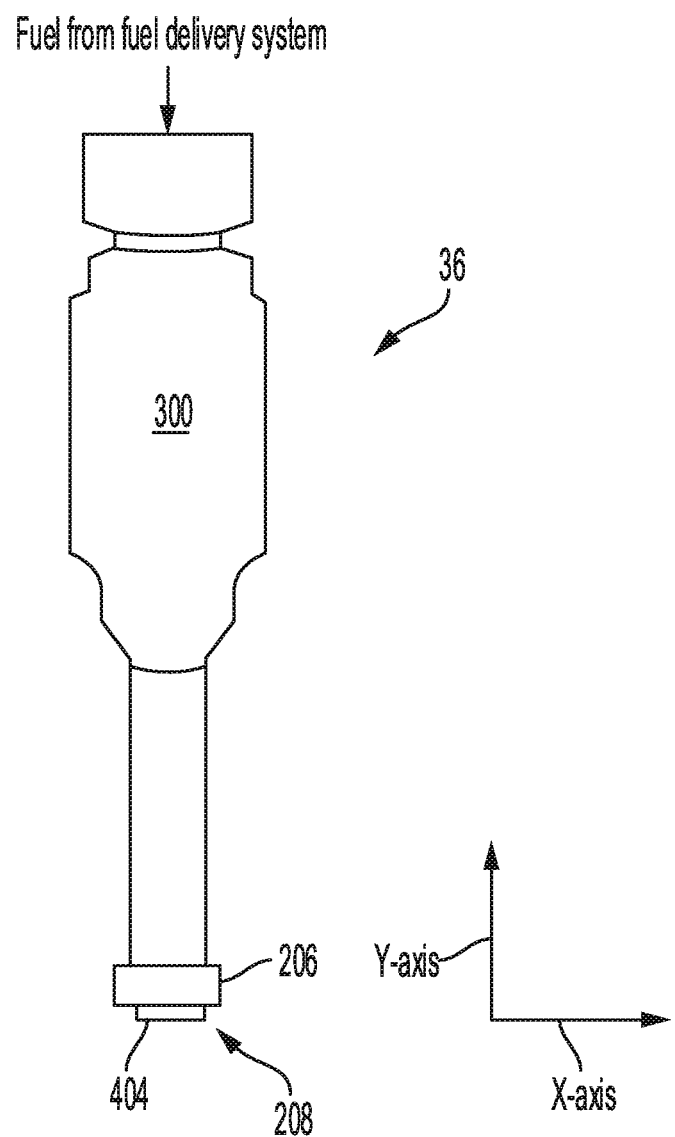
FIG. 3 shows a detailed illustration of the fuel injector, shown in FIG. 2.
Figure 4:
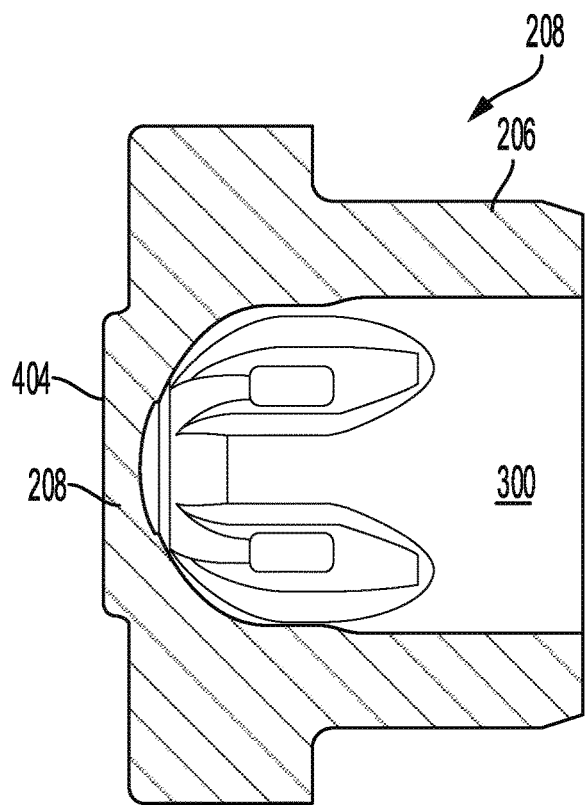
FIG. 4 shows a side plan view of a first embodiment of a nozzle included in the fuel injector shown in FIG. 3.
Figure 6:
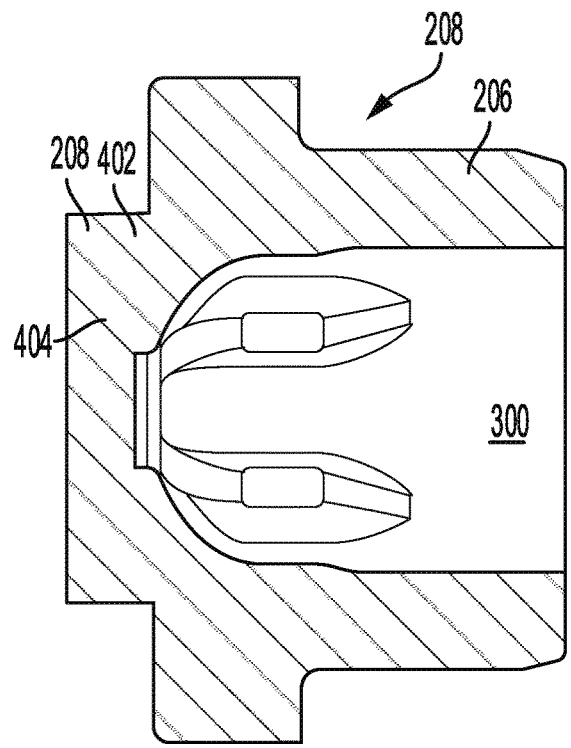
FIG. 6 shows a side plan view of a second embodiment of a nozzle included in the fuel injector shown in FIG. 3.
Figure 5:
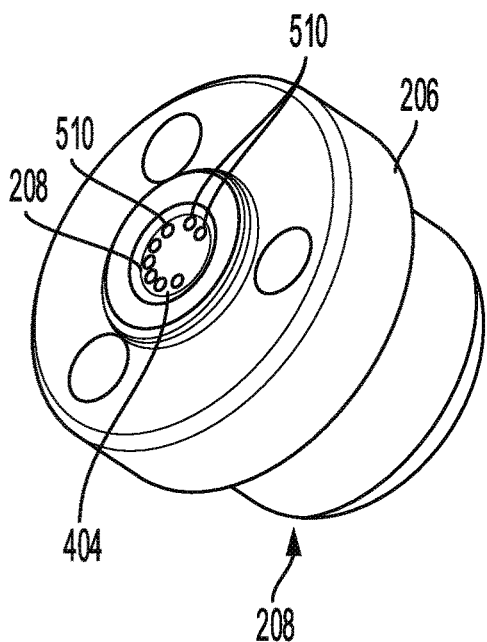
FIG. 5 shows an enlarged isometric view of the nozzle of FIG. 4.
Figure 7:
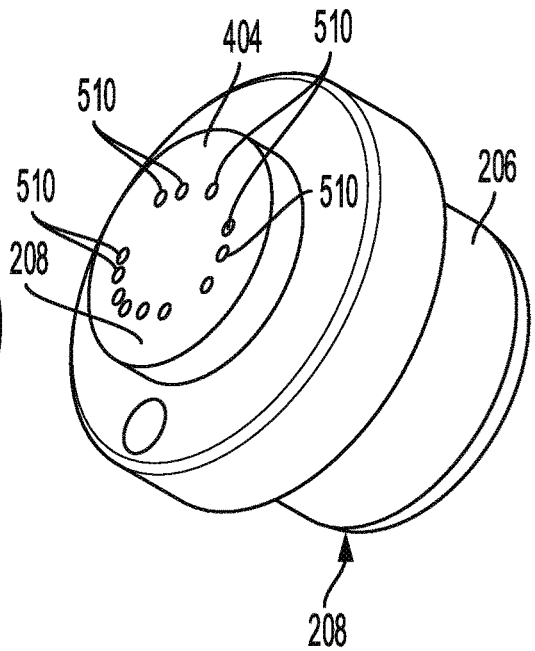
FIG. 7 shows an enlarged isometric view of the nozzle of FIG. 6.
Figure 14:
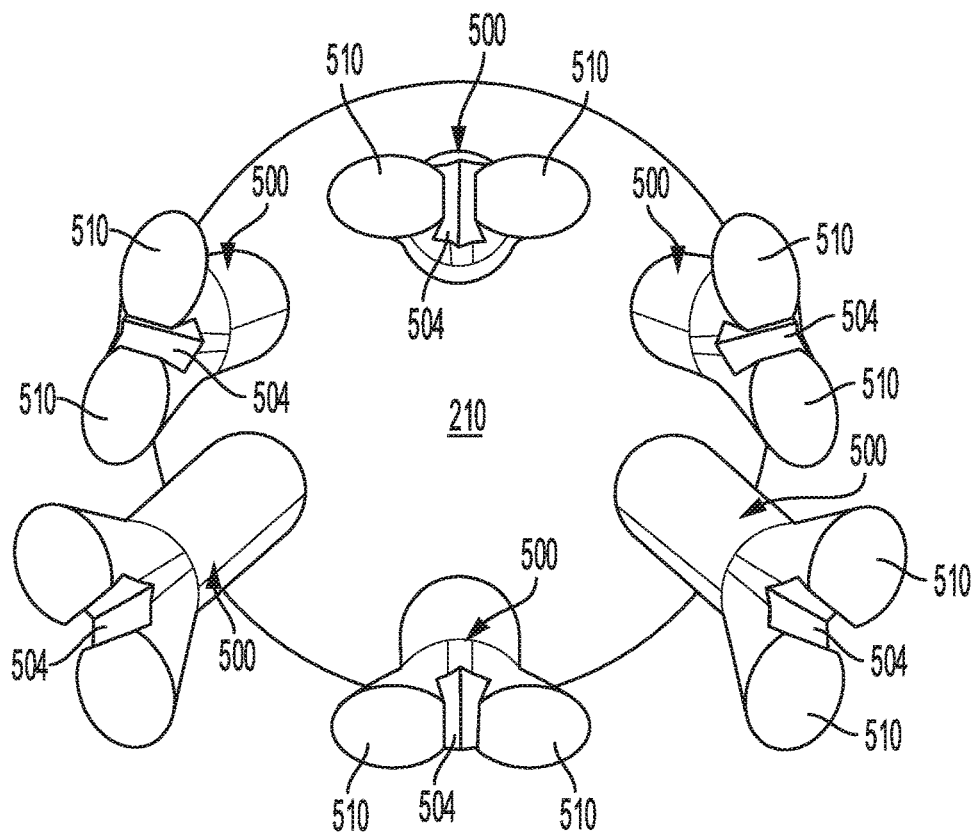
FIG. 14 shows a possible orientation on a nozzle shown in FIGS. 4-7 of a plurality of spaced-apart split flow paths of FIGS. 8A-13 shown to scale and in solid.
Figure 15:
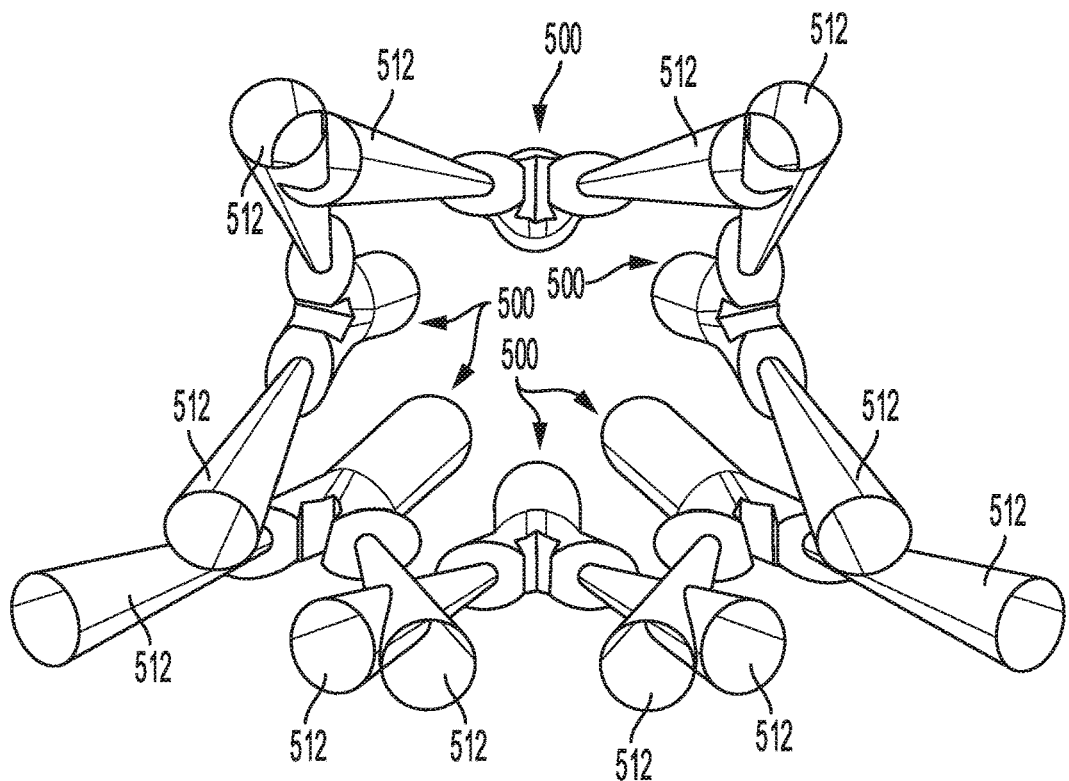
FIG. 15 shows a possible intermixing fuel spay pattern generated from the possible orientation of a plurality of spaced-apart flow paths shown in FIG. 14.
Figures 16, 17:
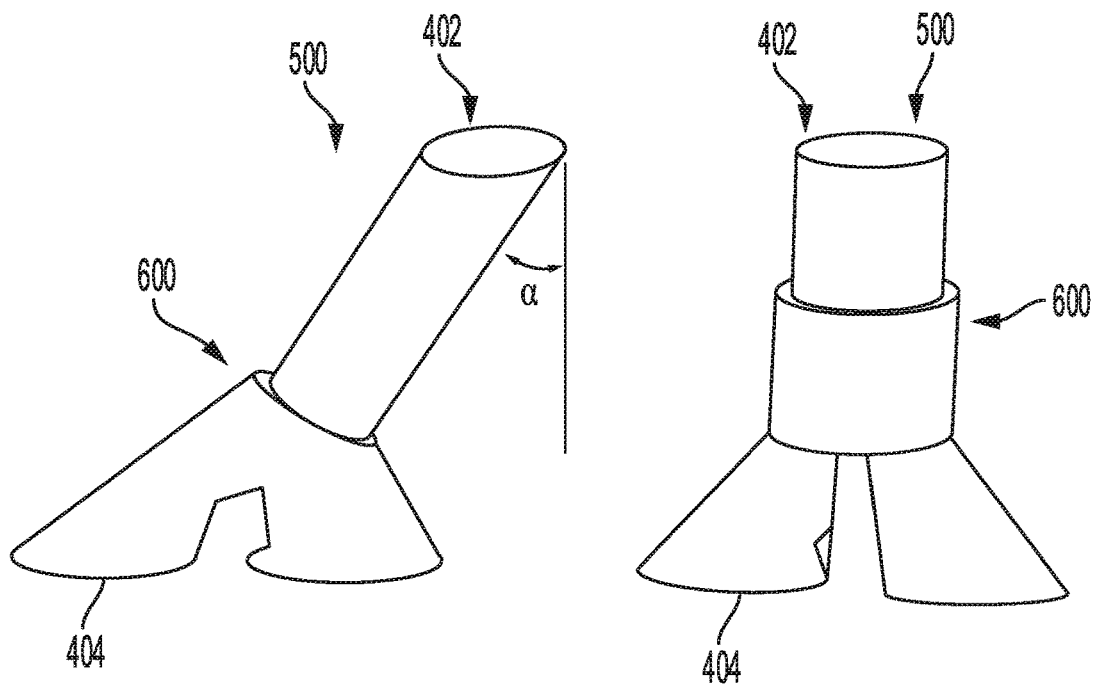
FIG. 16 shows a seventh possible split flow path through the nozzles of FIGS. 4-7 shown to scale and in solid.
FIG. 17 shows an eighth possible split flow path through the nozzles of FIGS. 4-7 shown to scale and in solid.
Figure 18:
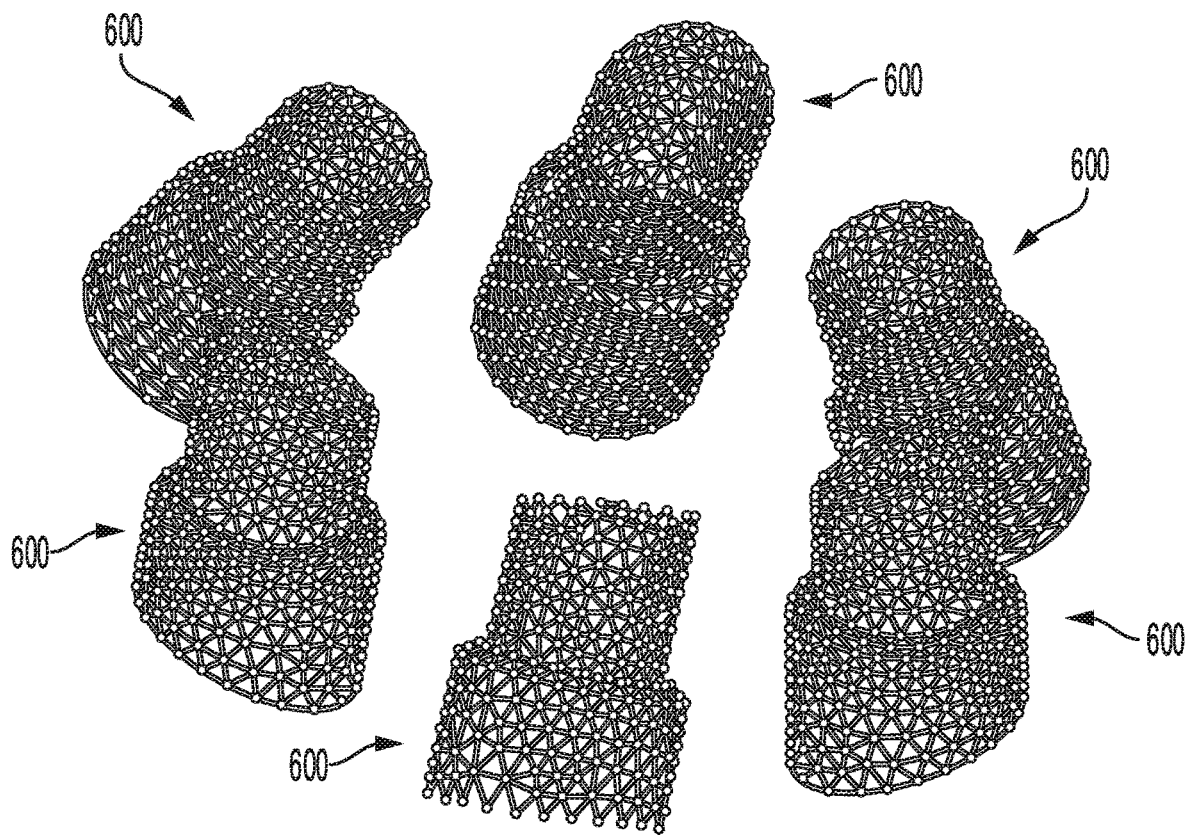
FIG. 18 shows additional alternative possible internal geometries that may be added to the split flow paths shown FIGS. 8A-13 and FIGS. 16 & 17 in accordance with an embodiment of the present invention.

FIG. 1 shows a schematic depiction of a vehicle with an internal combustion engine including a fuel delivery system having a direct fuel injector. FIG. 2 shows an example of the cylinder and direct fuel injector in the fuel delivery system, shown in FIG. 1, in cross-section. FIG. 3 shows a detailed view of the direct fuel injector, shown in FIG. 2. FIGS. 4 & 5 show a first embodiment of a nozzle of the direct fuel injector, shown in FIG. 3, configured to provide at least one divided orifice therethrough. FIGS. 6 and 7 a second embodiment of nozzle of the direct fuel injector, shown in FIG. 3, configured to provide a least one divided orifice therethrough. FIG. 8 shows a first possible divided orifice showing a possible orientation within the nozzle. It also shows the divided orifice broken away, enlarged and in solid to better show internal detail. All other exemplar divided orifices shown in the remaining figures are similarly oriented on the nozzle and shown in solid. FIGS. 9-13 show exemplar alternative possible divided orifices. FIG. 14 shows a plurality of spaced-apart divided orifices operably received within a nozzle. FIG. 15 shows an exemplar spray pattern of the plurality of spaced-apart divided orifices of FIG. 14. FIGS. 16-18 show additional internal geometries and orientations that may be added to the divided orifices of the embodiments shown.

Turning to FIG. 1, a vehicle 10 having an engine 12 with a fuel delivery system 14 is schematically illustrated. Although, FIG. 1 provides a schematic depiction of various engine and fuel delivery system components, it will be appreciated that at least some of the components may have a different spatial positions and greater structural complexity than the components shown in FIG. 1. The structural details of the components are discussed in greater detail herein with regard to FIGS. 2-18.

An intake system 16 providing intake air to a cylinder 18 is also depicted in FIG. 1. Although, FIG. 1 depicts the engine 12 with one cylinder, the engine 12 may have an alternate number of cylinders. For instance, the engine 12 may include two cylinders, three cylinders, six cylinders, etc., in other examples.

The intake system 16 includes an intake conduit 20 and a throttle 22 coupled to the intake conduit. The throttle 22 is configured to regulate the amount of airflow provided to the cylinder 18. In the depicted example, the intake conduit 20 feeds air to an intake manifold 24. The intake manifold 24 is coupled to and in fluidic communication with intake runners 26. The intake runners 26 in turn provide intake air to intake valves 28. In the illustrated example, two intake valves are depicted in FIG. 1. However, in other examples, the cylinder 18 may include a single intake valve or more than two intake valves. The intake manifold 24, intake runners 26, and intake valves 28 are included in the intake system 16.

The intake valves 28 may be actuated by intake valve actuators 30. Likewise, exhaust valves 32 coupled to the cylinder 18 may be actuated by exhaust valve actuators 34. In particular, each intake valve may be actuated by an associated intake valve actuator and each exhaust valve may be actuated by an associated exhaust valve actuator. In one example, the intake valve actuators 30 as well as the exhaust valve actuators 34 may employ cams coupled to intake and exhaust camshafts, respectively, to open/close the valves. Continuing with the cam driven valve actuator example, the intake and exhaust camshafts may be rotationally coupled to a crankshaft. Further in such an example, the valve actuators may utilize one or more of cam profile switching (CPS), variable cam timing (VCT), variable valve timing (VVT) and/or variable valve lift (VVL) systems to vary valve operation. Thus, cam timing devices may be used to vary the valve timing, if desired. It will therefore be appreciated, that valve overlap may occur in the engine, if desired. In another example, the intake and/or exhaust valve actuators, 30 and 34, may be controlled by electric valve actuation. For example, the valve actuators, 30 and 34, may be electronic valve actuators controlled via electronic actuation. In yet another example, cylinder 18 may alternatively include an exhaust valve controlled via electric valve actuation and an intake valve controlled via cam actuation including CPS and/or VCT systems. In still other embodiments, the intake and exhaust valves may be controlled by a common valve actuator or actuation system.

The fuel delivery system 14 provides pressurized fuel to a direct fuel injector 36. The fuel delivery system 14 includes a fuel tank 38 storing liquid fuel (e.g., gasoline, diesel, bio-diesel, alcohol (e.g., ethanol and/or methanol) and/or combinations thereof). The fuel delivery system 14 further includes a fuel pump 40 pressurizing fuel and generating fuel flow to a direct fuel injector 36. A fuel conduit 42 provides fluidic communication between the fuel pump 40 and the direct fuel injector 36. The direct fuel injector 36 is coupled (e.g., directly coupled) to the cylinder 18. The direct fuel injector 36 is configured to provide metered amounts fuel to the cylinder 18. The fuel delivery system 14 may include additional components, not shown in FIG. 1. For instance, the fuel delivery system 14 may include a second fuel pump. In such an example, the first fuel pump may be a lift pump and the second fuel pump may be a high-pressure pump, for instance. Additional fuel delivery system components may include check valves, return lines, etc., to enable fuel to be provided to the injector at desired pressures.

An ignition system 44 (e.g., distributorless ignition system) is also included in the engine 12. The ignition system 44 provides an ignition spark to cylinder via ignition device 46 (e.g., spark plug) in response to control signals from the controller 100. However, in other examples, the engine may be designed to implement compression ignition, and therefore the ignition system may be omitted, in such an example.

An exhaust system 48 configured to manage exhaust gas from the cylinder 18 is also included in the vehicle 10, depicted in FIG. 1. The exhaust system 48 includes the exhaust valves 32 coupled to the cylinder 18. In particular, two exhaust valves are shown in FIG. 1. However, engines with an alternate number of exhaust valves have been contemplated, such as an engine with a single exhaust valve, three exhaust valves, etc. The exhaust valves 32 are in fluidic communication with exhaust runners 50. The exhaust runners 50 are coupled to and in fluidic communication with an exhaust manifold 52. The exhaust manifold 52 is in turn coupled to an exhaust conduit 54. The exhaust runners 50, exhaust manifold 52, and exhaust conduit 54 are included in the exhaust system 48. The exhaust system 48 also includes an emission control device 56 coupled to the exhaust conduit 54. The emission control device 56 may include filters, catalysts, absorbers, etc., for reducing tailpipe emissions.

During engine operation, the cylinder 18 typically undergoes a four stroke cycle including an intake stroke, compression stroke, expansion stroke, and exhaust stroke. During the intake stroke, generally, the exhaust valves close and intake valves open. Air is introduced into the cylinder via the corresponding intake passage, and the cylinder piston moves to the bottom of the cylinder so as to increase the volume within the cylinder. The position at which the piston is near the bottom of the cylinder and at the end of its stroke (e.g., when the combustion chamber is at its largest volume) is typically referred to by those of skill in the art as bottom dead center (BDC). During the compression stroke, the intake valves and exhaust valves are closed. The piston moves toward the cylinder head so as to compress the air within combustion chamber. The point at which the piston is at the end of its stroke and closest to the cylinder head (e.g., when the combustion chamber is at its smallest volume) is typically referred to by those of skill in the art as top dead center (TDC). In a process herein referred to as injection, fuel is introduced into the cylinder. In a process herein referred to as ignition, the injected fuel in the combustion chamber is ignited via a spark from an ignition device (e.g., spark plug) and/or compression, in the case of a compression ignition engine. During the expansion stroke, the expanding gases push the piston back to BDC. A crankshaft converts this piston movement into a rotational torque of the rotary shaft. During the exhaust stroke, in a traditional design, exhaust valves are opened to release the residual combusted air-fuel mixture to the corresponding exhaust passages and the piston returns to TDC.

FIG. 1 also shows a controller 100 in the vehicle 10. Specifically, controller 100 is shown in FIG. 1 as a conventional microcomputer including: microprocessor unit 102, input/output ports 104, read-only memory 106, random access memory 108, keep alive memory 110, and a conventional data bus. Controller 100 is configured to receive various signals from sensors coupled to the engine 12. The sensors may include engine coolant temperature sensor 120, exhaust gas sensors 122, an intake airflow sensor 124, etc. Additionally, the controller 100 is also configured to receive throttle position (TP) from a throttle position sensor 112 coupled to a pedal 114 actuated by an operator 116.

Furthermore, the controller 100 may be configured to trigger one or more actuators and/or send commands to components. For instance, the controller 100 may trigger adjustment of the throttle 22, intake valve actuators 30, exhaust valve actuators 34, ignition system 44, and/or fuel delivery system 14. Specifically, the controller 100 may be configured to send signals to the ignition device 46 and/or direct fuel injector 36 to adjust operation of the spark and/or fuel delivered to the cylinder 18. Therefore, the controller 100 receives signals from the various sensors and employs the various actuators to adjust engine operation based on the received signals and instructions stored in memory of the controller. Thus, it will be appreciated that the controller 100 may send and receive signals from the fuel delivery system 14.

For example, adjusting the direct fuel injector 36 may include adjusting a fuel injector actuator to adjust the direct fuel injector. In yet another example, the amount of fuel to be delivered via the direct fuel injector 36 may be empirically determined and stored in predetermined lookup tables or functions. For example, one table may correspond to determining direct injection amounts. The tables may be indexed to engine operating conditions, such as engine speed and engine load, among other engine operating conditions. Furthermore, the tables may output an amount of fuel to inject via direct fuel injector to the cylinder at each cylinder cycle. Moreover, commanding the direct fuel injector to inject fuel may include at the controller generating a pulse width signal and sending the pulse width signal to the direct fuel injector.

FIG. 2 shows a cross-section of an example of the engine 12. The engine 12 is shown including a cylinder block 200 coupled to a cylinder head 202 forming the cylinder 18. One of the exhaust valves 32 and one of the intake valves 28, are shown in FIG. 2. Therefore, it will be appreciated that the additional exhaust and intake valves are hidden from view in FIG. 2. However, in other examples, only one intake and one exhaust valve may be coupled to the cylinder.

Additionally, a piston 204 is disposed within the cylinder 18 and connected to a crankshaft 206. The direct fuel injector 36 and specifically a nozzle 208 of the direct fuel injector 36 is shown positioned in an upper region of the cylinder 18 with regard to a central axis 210 of the cylinder 18. Additionally, the direct fuel injector 36 is also positioned horizontally between the intake valve 28 and the exhaust valve 32, in the illustrated example. Specifically, the nozzle 208 of the direct fuel injector 36 is position between the intake valve 28 and the exhaust valve 32 with regard to a horizontal axis. Coordinate axes X and Z are provided for reference. In one example, the Z axis may be parallel to a gravitational axis. Further, the X axis may be a lateral or horizontal axis.

FIG. 2 also shows one of the intake runners 26 in fluidic communication with the intake valve 28. Likewise, FIG. 2 additionally shows one of the exhaust runners 50 in fluidic communication with the exhaust valve 32. It will be appreciated that the exhaust runner, shown in FIG. 2, flows exhaust gas to downstream components in the exhaust system. On the other hand, the intake runner shown in FIG. 2 receives intake air from upstream intake system components.

The direct fuel injector 36 is also shown receiving fuel from a fuel source in the fuel delivery system 14, shown in FIG. 1. It will be appreciated that the fuel source may be one or more of the upstream components in the fuel delivery system, such as a fuel conduit, fuel pump, fuel tank, fuel rail, etc.

FIG. 3 shows a detailed view of the direct fuel injector 36, shown in FIG. 2. The direct fuel injector 36 includes a body 300. The body 300 is configured to receive fuel from a fuel source in the fuel delivery system 14, shown in FIG. 1. The body 300 may include an actuator (e.g., solenoid) that receives control signals from the controller 100, shown in FIG. 1.

Continuing with FIG. 3, the direct fuel injector 36 further includes the nozzle 208 configured to spray metered amounts of fuel into the cylinder 18, shown in FIG. 2. The nozzle 208 may include a frame 206 for operably engaging the body 300 to define a chamber therein and an injector plate 208 operably secured thereto. The chamber serves as a plenum 210 (FIG. 14) for delivering pressurized fuel to the injector plate 208. The injector plate 208 has an inlet side 402 that operably engages the plenum 210 (FIG. 14) and an exhaust side 404 that operably engages the cylinder 18 (FIG.

2). The injector plate 208 includes at least one fuel flow path 500 therethrough extending from plenum 210 through an inlet orifice 502 on the inlet side 402 to and extending through the exhaust side 404, thereby delivering fuel through the nozzle 208 to the cylinder 18.

Referring to FIGS. 4 & 5, a first possible assembly of the frame 206 and injector plate 208 is disclosed. The frame 206 may be formed or molded with the injector plate 208 formed separately and then operably secured thereto my form-fitting, welding or the like. Alternatively, FIGS. 6 & 7 show the frame 206 and injector plate 208 being a monolithic structure integrally formed by three-dimensional printing or the like.

Figure 8A:
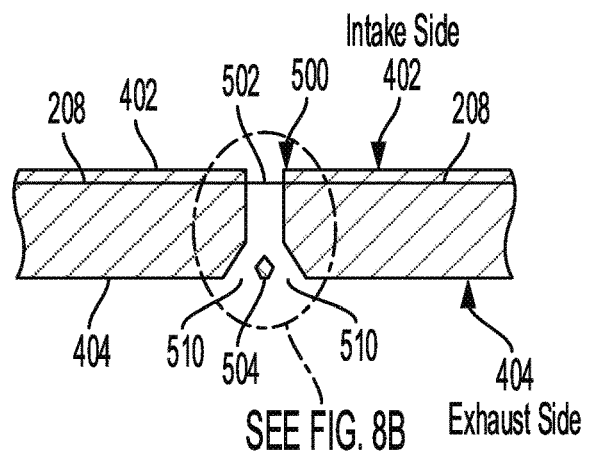
FIG. 8A shows a partial cross-section view of a nozzle shown in FIGS. 4-7 showing a first possible split flow path therethrough in accordance with an embodiment of the present invention.

FIG. 8A shows an exemplar divided fuel flow path 500 through the injector plate 208. The fuel flow path 500 enters the injector plate 500 through inlet orifice 502 and is split by a divider 504 along its path to define an upstream flow path 506 that leads to at least two separated exit flow paths 508, each exit flow path 508 defines an exit orifice 510 on the exhaust side 404 of the injector plate 208. Fuel from the body 300 is received within the plenum 210 and enters the inlet orifice 502 of the nozzle 208. Fuel then travels down the upstream flow path 506 until it is split by the divider 504. It then travels down the exit flow paths 508 through the exit orifices 510 and into the cylinder 18. Providing more than one exit orifice 510 from an inlet orifice 502 facilitates the formation of smaller fuel droplets and atomization of the fuel upon exit from the nozzle 208.

Figure 8B:
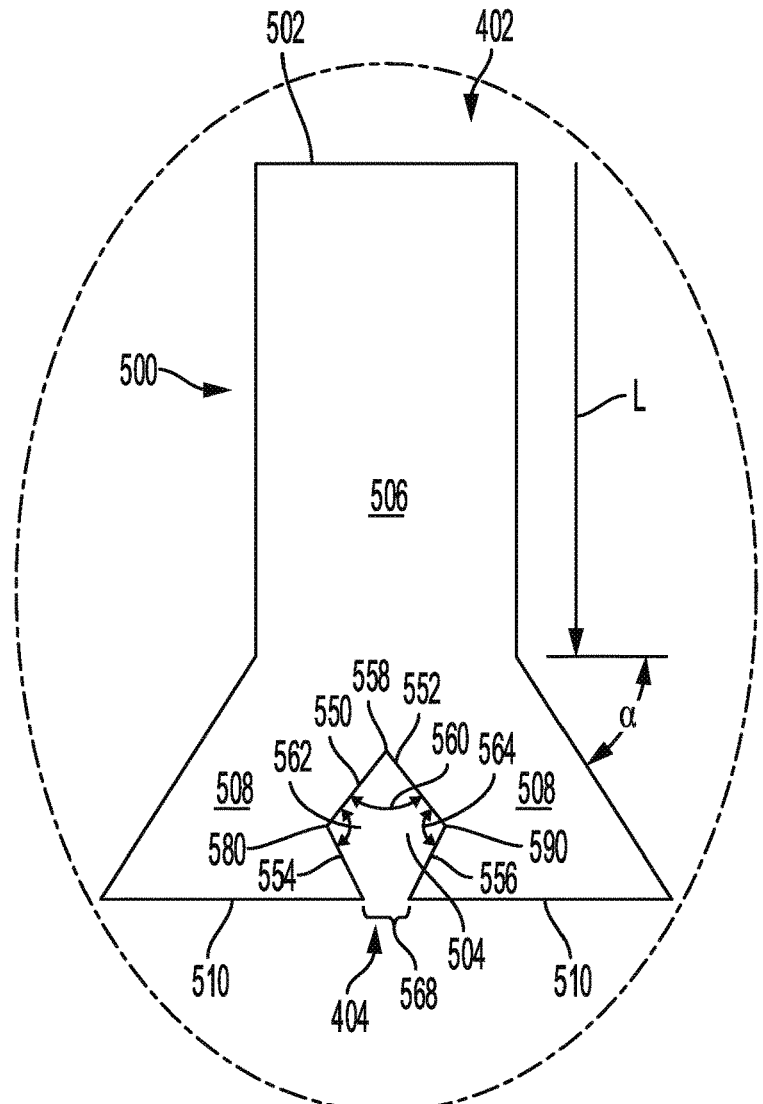
FIG. 8B shows the first possible flow path of FIG. 8A shown enlarged, broken away, to scale, and in solid to provide internal detail. Dimensions of the flow path are to scale.
Figure 9:
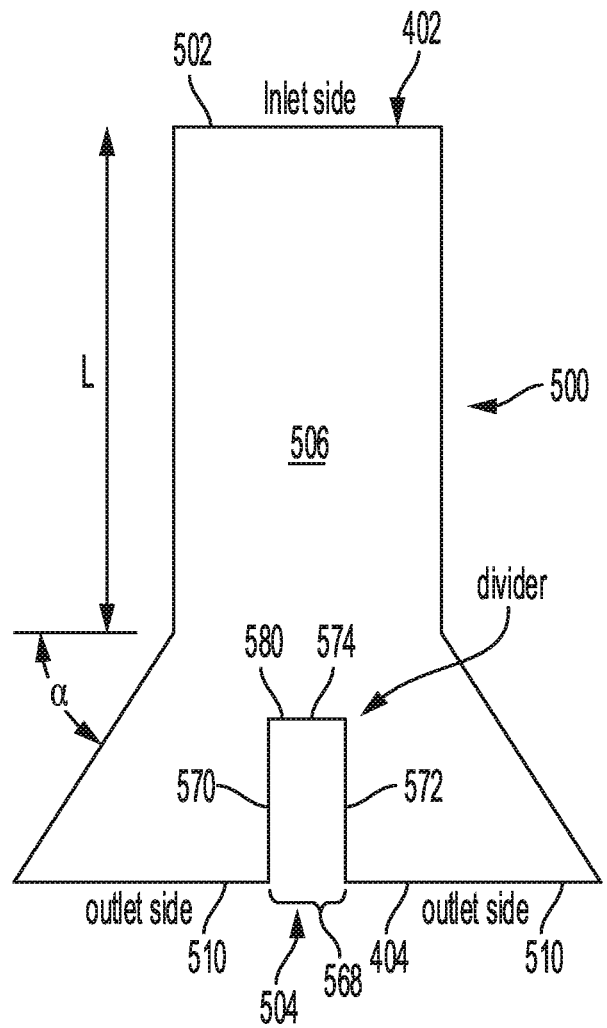
FIG. 9 shows a second possible split flow path through the nozzles of FIGS. 4-7 shown to scale and in solid in accordance with an embodiment of the present invention.

To facilitate understanding, FIG. 8B shows the fuel flow path 500 enlarged and in solid to provide greater detail and allow the geometries of the fuel flow path 500 to be further described and explained. Other exemplar divided flow paths 500 shown in FIGS. 10-18 are also shown in solid. The divider 504 may have a defined shape such as a substantially triangular or wedge shape as shown in FIGS. 8 and 10-17, or a rectangular shape as shown in FIG. 9. A substantially triangular shape would have a cross-section the portion of which would define a polygon with three edges and three vertices. A substantially wedge shape can be a polyhedron defined by two triangles and three trapezoid faces.

The fuel flow path 500 in FIGS. 8A & 8B may have a defined upstream flow path length L, a deflection angle (α) at the divider, and a divider 504 having a defined shape as shown. In this disclosed embodiment, the fuel flow path 500 is substantially Y-shaped, the inlet and exhaust orifices 502, 510, respectively, are substantially oval shaped, and the cross-sectional area of the inlet orifice 502 is greater than one of the exhaust orifices 510 with the combined cross-sectional areas of the all exhaust orifices 510 stemming from an inlet orifice 502 being greater than the cross-sectional area of the inlet orifice 502. Other possible embodiments may include the inlet flow path being divided into more than two exit flow paths, and the inlet and exhaust orifices having non-oval cross-sectional shapes.

These characteristics may be selected as desired to deliver desirable fuel velocity, dispersion, droplet formation and mixing characteristics to the cylinder. For example, and referring to FIG. 8B, the divider 504 may be formed within the flow path 500 by a forward left wall 550 joining a forward right wall 552 to define a leading edge 558 protruding into the flow path and defining forward angle 560. The forward left and forward right walls 550, 552, respectively can be joined together at a defined forward angle 560 to form a wedge or triangular shape as shown with the leading edge 558 defining one corner of the triangle or wedge.

If desired, a rear left wall 554 can join the opposite edge of the front left wall 550 to define left angle 562, and a rear right wall 556 can join the opposite edge of front right wall 552 to define right angle 564 as shown in FIG. 8B. The left angle 562 and right angle 564 can be optimized to allow the opposite ends of the left and right rear walls to define a spaced-apart distance 568 of the exhaust orifices 510. The lengths of the left and right forward walls 550, 552, respectively, and the lengths of the left and right ear walls 554, 556, respectively, may be substantially the same, and the angles of the forward, left and right angles 560, 562 & 564, respectively may be substantially the same as shown. Alternatively, each length and angle for these components may be individually set to provide a unique divider 504 geometry within the flow path 500 as desired.

Referring to FIG. 9, the substantially rectangular divider 504 can be formed by a left wall 554 and spaced-apart, substantially parallel right wall 572 extending into the flow path 500 to define a spaced-apart distance 568 between exhaust orifices 510. A forward wall 574 can connect the opposite distal ends of the left and right walls 570, 572, respectively, connecting the distal ends of the left and right walls 520 defining a flow-engaging surface 580 that is substantially perpendicular to the flow of fuel through along length L as shown. The lengths of the left and right walls may be substantially the same as shown, or the lengths may differ thereby allowing angle of the flow-engaging surface 580 of the forward wall 574 relative to the flow of fuel along the length L to be optimized as needed.

Promoting cavitation through the exit flow paths facilitates the atomization of the fuel, thereby promoting smaller fuel droplets and promoting better mixing. Split flow paths with a wedge-shaped divider with the following defined characteristics have been demonstrated to improve fuel atomization upon exit from the nozzle.

Figure 10:
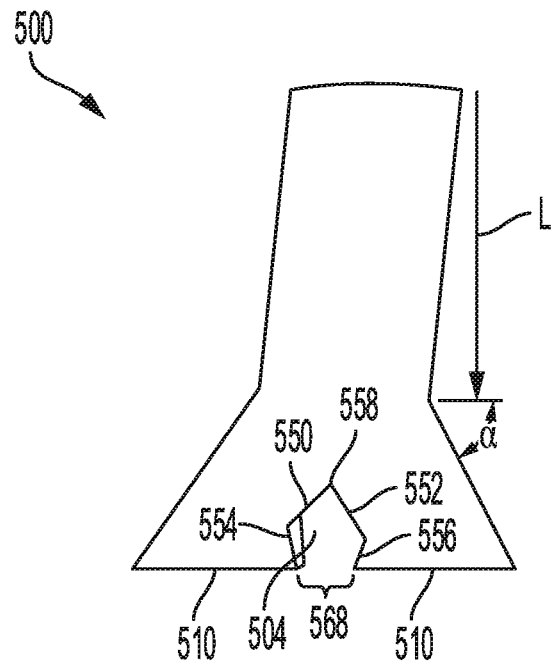
FIG. 10 shows a third possible split flow path through the nozzles of FIGS. 4-7 shown to scale and in solid in accordance with an embodiment of the present invention.
Figure 11:
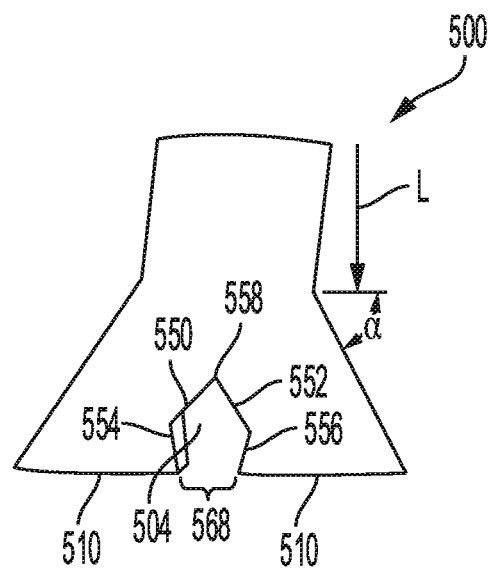
FIG. 11 shows a fourth possible split flow path through the nozzles of FIGS. 4-7 shown to scale and in solid in accordance with an embodiment of the present invention.
Figure 12:
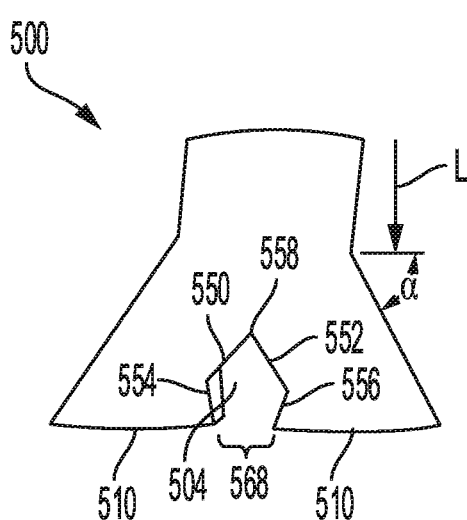
FIG. 12 shows a fifth possible split flow path through the nozzles of FIGS. 4-7 shown to scale and in solid in accordance with an embodiment of the present invention.
Figure 13:
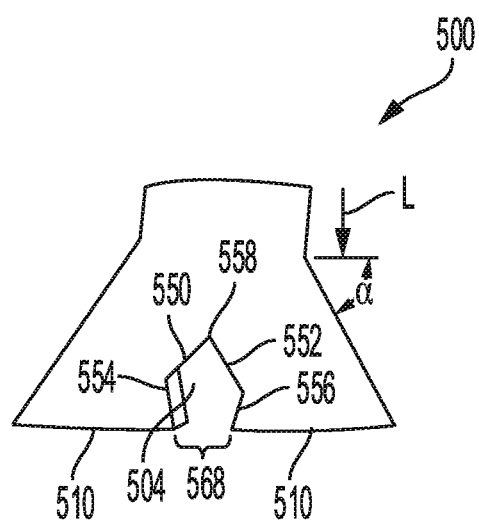
FIG. 13 shows a sixth possible split flow path through the nozzles of FIGS. 4-7 shown to scale and in solid in accordance with an embodiment of the present invention.

| L (micrometers) | Inlet vs. Outlet Ratio | Outlet Shape | α Angle | Wedge Shape | Scale Drawing Shown |
| --- | --- | --- | --- | --- | --- |
| 400 | 1.5 | Oval | 26° | Triangle | FIG. 10 |
| 200 | 1.5 | Oval | 26° | Triangle | FIG. 11 |
| 150 | 1.5 | Oval | 26° | Triangle | FIG. 12 |
| 100 | 1.5 | Oval | 26° | Triangle | FIG. 13 |

In the foregoing set of parameters, highest fuel cavitation was achieved when L was set to 100 μm. However, as an example, if an injector tip thickness is approximately 600 microns (μm), favorable fuel atomization properties can be obtained with one or more of L ranging between 0-600 μm, and more preferably L ranging between 200 μm and 400 μm, the outlet to inlet ratio less than or equal to 2, and α angle ranging between 20° to 80°.

Referring to FIG. 14, it can be appreciated that the nozzle 208 may include a plurality of divided fuel flow paths 500 each in fluid communication with the plenum 210. The fuel flow paths 500 may be spaced apart from each other around the injector plate 208 as shown so as to optimize the distribution of atomized fuel leaving the nozzle 208. Moreover, the exit flow path 508 may be directed away from the cylinder walls and piston 204 (FIG. 2) so as to prevent inadvertent fuel buildup on these structures.

As shown in FIG. 15, the exit orifices 10 of the divided fuel flow paths 500 may be directed so as to allow a spray 512 of atomized fuel exiting each flow path 500 to overlap and intermix with fuel exiting from an adjacent divided fuel flow paths 500 as shown. This further promotes optimal mixing of the fuel within the cylinder 18.

Referring to FIGS. 16-18, a variety of expansion sleeves 600 along the upstream flow path 506 can be provided. These expansion sleeves 600 allow for further optimization of the fuel flow characteristics as needed, and they can each be coupled to a divider 504 as shown. The upstream flow path 506 may be angled from the inlet orifice 502 as shown in FIG. 16 or situated substantially perpendicular to the inlet orifice 502 as shown in FIG. 17.

FIGS. 1-18 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, elements shown contiguous or adjacent to one another may be contiguous or adjacent to each other, respectively, at least in one example. For example, laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will further be described in the following paragraphs. In one aspect, a direct fuel injector is provided. The direct fuel injector comprises a nozzle in fluidic communication with a fuel source. The nozzle including an intake side and an opposite exhaust side, a fuel flow path for transmitting fuel from the fuel source therethrough, the fuel flow path extending through the nozzle from an inlet orifice on the intake side to the exhaust side; and, a divider within the fuel flow path for dividing the fuel flow path into a least two fuel exit flow paths, each fuel exit flow path defining an exit orifice on the exhaust side of the nozzle.

In another aspect, a fuel delivery system is provided. The fuel delivery system comprises a cylinder, an exhaust valve coupled to the cylinder, an intake valve coupled to the cylinder, and a direct fuel injector coupled to the cylinder, the direct fuel injector including, a body receiving fuel from a fuel source, and a nozzle in fluidic communication with the body, the in fluid communication with a fuel source, and including an intake side and an opposite exhaust side, a fuel flow path for transmitting fuel from the fuel source therethrough, the fuel flow path extending through the nozzle from an inlet orifice on the intake side to the exhaust side; and, a divider within the fuel flow path for dividing the fuel flow path into a least two fuel exit flow paths, each fuel exit flow path defining an exit orifice on the exhaust side of the nozzle.

It will be appreciated that the configurations and routines disclosed herein are exemplary in nature, and that these specific embodiments are not to be considered in a limiting sense, because numerous variations are possible. For example, the divider is shown splitting the fuel flow path into two exit flow paths. It can be appreciated that the divider could split the fuel flow path into more than two exit flow paths as desired. Moreover, multiple dividers may be placed along the fuel flow path to further divide an exit flow path into a plurality of divided flow paths. Also, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A direct fuel injector comprising:
   a nozzle in fluid communication with a fuel source, including;
   an intake side and an opposite exhaust side;
   a fuel flow path for transmitting fuel from the fuel source therethrough, the fuel flow path extending through the nozzle from an inlet orifice on the intake side to the exhaust side; and,
   a divider within the fuel flow path for dividing the fuel flow path into a least two fuel exit flow paths, each fuel exit flow path defining an exit orifice on the exhaust side of the nozzle, wherein the divider is substantially wedge or rectangular shaped.

2. The direct fuel injector of claim 1, wherein the inlet orifice has a cross-sectional area that is larger than the cross-sectional area than one of exhibit orifices.

3. The direct fuel injector of claim 1, wherein a cross-sectional ratio of all exit orifices and the inlet orifice is less than or equal to 2.

4. The direct fuel injector of claim 2, wherein the cross-sectional area of the inlet orifice is smaller than the combined cross-sectional area of all exit orifices in flued communication with the inlet orifice.

5. The direct fuel injector of claim 1, wherein the fuel flow path is substantially Y-shaped defining an upstream flow path and two exit flow paths dividing the upstream flow path at the divider.

6. The direct fuel injector of claim 5, wherein the upstream flow path has a defined length "L" from the inlet orifice to the divider, and each exit flow path splits off from the divider at a defined angle α.

7. The direct fuel injector of claim 6, wherein "L" is within the range 200 μm to 400 μm.

8. The direct fuel injector of claim 6, wherein angle α is within the range 20° to 80°.

9. The direct fuel injector of claim 1, further including an expansion sleeve operably received within the flow path.

10. The direct fuel injector of claim 1, further including:
a plurality of fuel flow paths for transmitting fuel from the fuel source therethrough, each fuel flow path of the plurality of fuel flow paths each extending through the nozzle from a separate spaced apart inlet orifice on the intake side to the exhaust side; and
a separate divider within each fuel flow path for dividing each fuel flow path into a least two fuel exit flow paths, each fuel exit flow path defining an exit orifice on the exhaust side of the nozzle.

11. The direct fuel flow injector of claim 10, wherein the exit orifices from the plurality of fuel flow paths are positioned along the exhaust side of the nozzle to promote mixing of fuel passing through the nozzle.

12. The direct fuel flow injector of claim 1, wherein the intake side of the nozzle is substantially planer and the fuel flow path enters the nozzle substantially perpendicular to the intake side.

13. The direct fuel flow injector of claim 1, wherein the exhaust side of the nozzle is substantially planer to define an exhaust side plane and a least one exit flow path exits the nozzle at angled relative to the exhaust side plane.

14. A fuel delivery system comprising:
a cylinder;
an exhaust valve coupled to the cylinder;
an intake valve coupled to the cylinder; and
a direct fuel injector coupled to the cylinder, the direct fuel injector including:
a body receiving fuel from a fuel source; and
a nozzle in fluid communication with the body, the nozzle including:
an intake side and an opposite exhaust side;
a fuel flow path extending through the nozzle from an inlet orifice on the intake side to the exhaust side; and
a divider within the fuel flow path for dividing the fuel flow path into a least two fuel exit flow paths, each fuel exit flow path defining an exit orifice on the exhaust side of the nozzle, where the divider has a shape from a group consisting of a rectangle, a wedge and a triangle.

15. The fuel delivery system of claim 14, wherein the wherein the fuel flow path is substantially Y-shaped defining an upstream flow path and two exit flow paths dividing the upstream flow path at the divider.

16. A method of injecting fuel into the cylinder of an internal combustion engine comprising:
operating a fuel injector secured to a fuel source, the fuel injector coupled to the cylinder to allow fuel from the fuel source to be received through a fuel flow path in a nozzle secured to the fuel injector; and
dividing fuel that has entered the nozzle along the fuel flow path into at least two exit flow paths from the nozzle via a divider, where a bottom side of the divider is leveled with an outlet side of the nozzle.

17. The method of injecting fuel into the cylinder of an internal combustion engine of claim 16, further including providing a plurality of spaced apart fuel flow paths through the nozzle.

* * * * *